United States Patent
Ogino

(10) Patent No.: US 6,282,020 B1
(45) Date of Patent: Aug. 28, 2001

(54) LASER MICROSCOPE AND CONFOCAL LASER SCANNING MICROSCOPE

(75) Inventor: Katsumi Ogino, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/691,260

(22) Filed: Oct. 19, 2000

(30) Foreign Application Priority Data

Oct. 21, 1999 (JP) .................................................. 11-299044

(51) Int. Cl.[7] .................................................. G02B 21/06
(52) U.S. Cl. .............................................. 359/385; 359/368
(58) Field of Search .................................. 359/368, 385, 359/386, 389, 390

(56) References Cited

U.S. PATENT DOCUMENTS 5,537,247 * 7/1996 Xiao ........................................ 359/368
5,933,274 * 8/1999 DeSimone ............................. 359/390
5,982,535 * 11/1999 Inoue et al. ............................ 359/394

* cited by examiner

*Primary Examiner*—Cassandra Spyrou
*Assistant Examiner*—Mark A. Robinson
(74) *Attorney, Agent, or Firm*—Miles & Stockbridge P.C.

(57) ABSTRACT

A laser microscope or a confocal laser scanning microscope is provided with a microscope main body mounted on an anti-vibration table and a laser light source for supplying a laser light to this microscope main body. The laser light source comprises a laser radiation source for radiating a laser light of a predetermined wavelength and a laser cavity for converting the wavelength of a laser light from the radiation source. The radiation source and the laser cavity are separated from each other, and are connected to each other by means of optical fiber. The laser cavity is incorporated into the microscope main body.

2 Claims, 6 Drawing Sheets

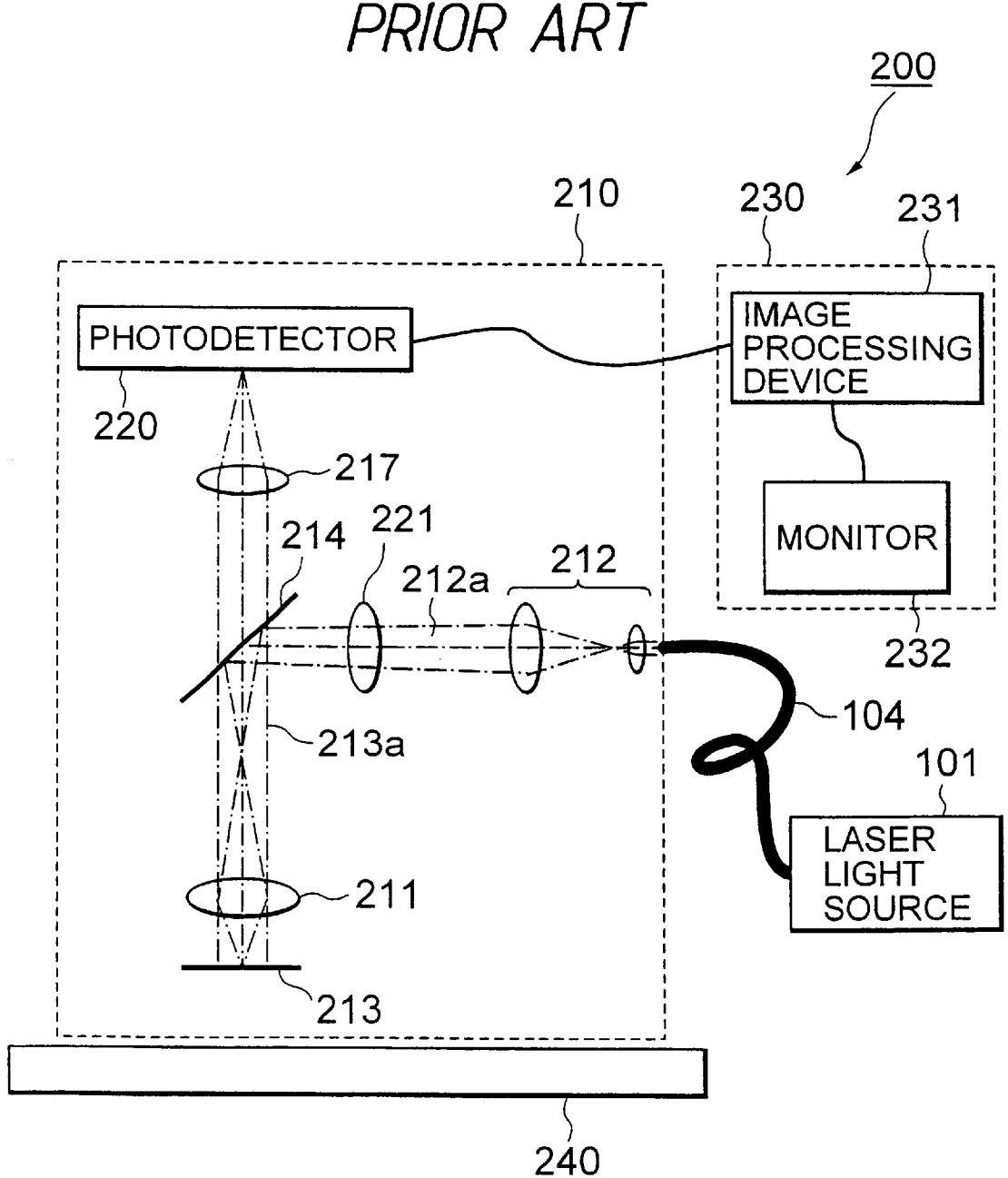

LASER MICROSCOPE AND CONFOCAL LASER SCANNING MICROSCOPE

The present application claims the benefit of Japanese Patent Application No.11-299044 which is hereby incorporated by reference.

BACKGROUND OF THE INVENTION

1. Field of the Invention

The present invention relates to a laser microscope and a confocal laser scanning microscope.

2. Related Background Art

When a sample with a fine structure is to be observed by a microscope, the critical resolution of the microscope can be expressed by the following:

$$\delta = \lambda/2NA \qquad (1).$$

In this expression, $\delta$ represents the resolution, $\lambda$ represents the wavelength in use, and NA represents the numerical aperture of an objective lens, respectively.

From the above expression (1), it is suffice in order to enhance the resolution, if the wavelength $\lambda$ is reduced, or the numerical aperture NA of the objective lens is enlarged, or the wavelength $\lambda$ is reduced while the numerical aperture NA of the objective lens is enlarged.

When a living sample is to be observed, if the living sample receives a light with a wavelength in the ultraviolet range or lower, the sample itself is damaged due to a photochemical reaction, or the like, so that the resolution can be enhanced by using an objective lens of a liquid immersion type having a large numerical aperture NA.

On the other hand, an inorganic sample (for example, a fine structural member such as an IC) is to be observed by means of an objective lens of the liquid immersion type, impurities may attach to the surface of the IC, or the like. In this case, it is highly probable that the microscope can not be used properly. Thus, the resolution is enhanced by irradiation of a light in the ultraviolet range or lower. In this respect, the inorganic sample itself is seldom damaged by the irradiation of a light in the ultraviolet range or lower.

Incidentally, since the scale of a fine structural member such as an IC is recently rapidly diminishing, it is also demanded to further enhance the resolution of a microscope. Though there exists conventionally a microscope employing an X ray or electron beam as a microscope of high resolution, such microscope is to observe the surface of a sample in a vacuum and the operability thereof is not satisfactory, compared with that of an optical microscope. It is therefore required to enhance the resolution by the use of an optical microscope with an excellent operability.

In order to enhance the resolution in an optical microscope, for example, by two times, if selecting the wavelength of the deep ultraviolet range (273 nm), which is a half of that of an e line (the wavelength of 546 nm) as the representative wavelength of a visible light, a design of the objective lens becomes difficult for the following reasons.

That is, the objective lens is often constituted by combining single lenses with each other since the achromatic method by bonding lenses of different glass materials together which is normally employed in designing a conventional objective lens can not be used, because there is no such adhesive as is not changed in quality in the deep ultraviolet region or there is few glass materials having a sufficient transmittance in the deep ultraviolet region.

In this case, when half width half maximum of the wavelength distribution with respect to the central wavelength is not in the order of picometer (pm) or less, a predetermined optical performance can not be obtained. As a result, an image with an excellent resolution can not be obtained.

It is known that a light source employing a mercury lamp or a xenon lamp also emits a light with the wavelength shorter than the ultraviolet region. However, when only a light having a wavelength with half width half maximum in the order of pm or less is taken out by an interference filter to be used as an illumination light, there arises a problem that a required brightness can not be obtained by means of a conventional image pickup tube or CCD which has no sufficient sensitivity in the deep ultraviolet region.

To cope with this problem, a storage time can be prolonged to securely obtain the required brightness or the half width half maximum can be expanded in proportion to the sensitivity. However, in this case, an image acquiring rate may be sacrificed or the optical performance may be deteriorated.

Accordingly, in order to observe an inorganic sample, a light having a wavelength with a sufficiently small half width half maximum is employed.

In the following, a specific example of a microscopic system employing a light in the deep ultraviolet region.

FIG. 4 is a block diagram for showing the constitution of a confocal laser scanning microscopic system.

A confocal laser scanning microscopic system (a confocal laser scanning microscope) 100 comprises a laser light source 101, a microscope main body 110, and an optical image system 130.

The laser light source 101 emits a laser light of the deep ultraviolet region (the wavelength of 200 nm to 300 nm).

The microscope main body 110 comprises a beam expander 112 for enlarging a laser light 101a to a light beam 112a which has a sufficient size to cover the pupil plane of an objective lens 111, a beam splitter 114 which does not transmit the laser light, but transmits therethrough a light reflected by a sample 113, a two-dimensional scanner unit 115 for two-dimensionally scanning the laser light, a relay lens 116, a collective lens 117, a pin hole plate 118 which is disposed at a position conjugate to the focal plane of the objective lens 111 and is formed with a pin hole 118a for transmitting therethrough only a light collected by the collective lens 117, and a photo detector 120 for detecting the light transmitted through the pin hole 118a so as to convert such light into an electric signal.

The optical image system 130 comprises an image processing unit 131, a monitor 132, and the like, for forming an image of the sample 113 on the basis of the electric signal from the photo detector 120.

Note that the microscope main body 110 is mounted on an anti-vibration table 140 for making up for a high image quality.

An operation of the confocal laser scanning microscopic system having the aforementioned structure will be described below.

The laser light 101a emitted from the laser light source 101 is guided onto an optical path by means of reflection mirrors 102 and 103, is transmitted through the beam expander 112, then is reflected by the beam splitter 114. After that, the laser light is two-dimensionally scanned by the two-dimensional scanner unit 115, and is irradiated as a spot 119 on the focal plane on the sample 113 by means of the relay lens 116 and the objective lens 111.

The light reflected by the spot 119 goes back on the optical path to the objective lens 111, the relay lens 116 and then to the two-dimensional scanner unit 115, so as to pass through the beam splitter 114.

The light passing through the beam splitter 114 is collected on the pin hole 118a by the collective lens 117, is converted into an electric signal by the photo detector 120, and is displayed on the optical image system 130 as an image.

Since only the light on the focal plane of the sample 113 passes through the pin hole 118a, an unnecessary diffused light is removed by the pin hole 118a, so that it is possible to obtain an image with remarkably improved resolution and contrast in the depth direction in the optical image system 130.

Incidentally, the laser light source 101 is not so small-sized as to be incorporated in the microscope main body 110 and a single mode optical fiber capable of propagating a deep ultraviolet light has not yet been put to practical use, so that the laser light source 101 is mounted on the anti-vibration table 140 together with the microscope main body 110.

FIG. 5 is a schematic view of a deep ultraviolet laser light source according to the prior art.

The deep ultraviolet laser light source 101 is provided with a laser radiation source (basic laser light generating means) 105 and a laser cavity (wavelength converting means) 106. The laser radiation source 105 radiates a laser light 101b having the wavelength of 532 nm, and the laser light 101b is guided to the laser cavity 106.

The laser cavity 106 incorporates therein BBO ($B_aB_2O_4$: barium boric acid) crystal, and this laser cavity 106 converts the laser light 101b with the wavelength of 532 nm into the laser light 101a with the wavelength of 266 nm.

FIG. 6 is a block diagram for showing the constitution of a microscopic system of a wide-field type. In FIG. 6, the identical portions to those in FIG. 5 are given the same referential numerals and symbols and description thereof will be omitted.

A microscopic system (laser microscope) 200 of a Koehler illumination type (wide-field type) comprises a laser light source 101 for radiating a laser light, a microscope main body 210, and an optical image system 230.

The microscope main body 210 is provided with a beam expander 212 for expanding a laser light to a light beam 212a which has a sufficient size to cover the pupil plane of an objective lens 211, a condensing lens 221, a beam splitter 214 which does not transmit the laser light, but transmits therethrough a light 213a reflected by a sample 213, a second objective lens 217, and a photo detector 220 for detecting a light focused by the second objective lens 217 so as to convert such light into an electric signal.

The optical image system 230 comprises an image processing unit 231, a monitor 232, and the like, for forming an image of the sample 213 on the basis of the electric signal from the photo detector 220.

An operation of a microscopic system of the Koehler illumination type having the aforementioned structure will be described below.

The laser light 101a emitted from the laser light source 101 is, after passing through the optical fiber (or a fiber bundle) 104 and the beam expander 212, reflected by the beam splitter 214, and is irradiated uniformly on the sample 213 by means of the objective lens 211.

The light 213a reflected by the sample 213 goes back to the objective lens 211, the beam splitter 114, and then the second objective lens 217.

The reflected light 213a is collected by the second objective lens 217, is converted into an electric signal by the photo detector 220, and is displayed on the optical image system 130 as an image.

However, in the confocal laser scanning microscopic system 100, the laser light source 101 is not so small-sized as to be incorporated in the microscope main body 110, a single mode optical fiber capable of propagating a deep ultraviolet light has not yet been put to practical use, and the laser light source 101 is mounted on the anti-vibration table 140 together with the microscope main body 110, so that the anti-vibration table 140 is required to be large-sized and the reflection mirrors 102 and 103 for guiding the laser light to the microscope main body are required to be adjusted, which results in an increase of the manufacturing cost.

Also, in the microscopic system 200 of the Koehler illumination type, the laser light source 101 is not required to be mounted on the anti-vibration table 240, so that the anti-vibration table 240 is not required to be large-size, unlike in the confocal laser scanning microscopic system 100. However, an optical fiber of an expensive quartz, fluorite, or the like, is employed as the optical fiber (or the fiber bundle) 104, which results in a high manufacturing cost.

SUMMARY OF THE INVENTION

The present invention was contrived taking such circumstances into consideration, and an object thereof is to reduce the manufacturing costs of a laser microscope and a confocal laser scanning microscope.

In order to solve the aforementioned problems, according to the present invention, there is provided a laser microscope which comprises a microscope main body mounted on an anti-vibration table and a laser light source for supplying a laser light to this microscope main body, wherein the laser light source comprises a basic laser light generating means for radiating a laser light of a predetermined wavelength and a wavelength converting means for converting the wavelength of the laser light from the basic laser light generating means, and is characterized in that:

the basic laser light generating means and the wavelength converting means are separated from each other, the basic laser light generating means and the wavelength converting means are connected to each other by means of optical fiber, and the wavelength converting means is incorporated into the microscope main body.

For example, in case of the wide-field microscope, an optical fiber made of expensive quartz, or the like, for guiding the laser light into the optical path of the microscope main body is no longer necessary, so that an inexpensive optical fiber is enough for guiding the laser light from the basic laser light generating means to the wavelength converting means.

Preferably, according to the present invention, in a confocal laser scanning microscope provided with a microscope main body mounted on an anti-vibration table and a laser light source for supplying a laser light to this microscope main body, wherein the laser light source comprises a basic laser light generating means for radiating a laser light of a predetermined wavelength and a wavelength converting means for converting the wavelength of a laser light from the basic laser light generating means, the basic laser light generating means and the wavelength converting means may be separated from each other, the basic laser light generating means and the wavelength converting means may be connected to each other by means of optical fiber, and the wavelength converting means may be incorporated into the microscope main body. In this case, the mirrors for guiding the laser light from the wavelength converting means to the optical path of the microscope main body is no longer required, and only an inexpensive optical fiber is required for guiding the laser light from the basic laser light generating means to the wavelength converting means. As a result, adjustment of the reflection mirrors in compliance with a change with time, or the like, is no longer required. In addition, the basic laser light generating means is not required to be mounted on the anti-vibration table, so that the anti-vibration table may be formed in a small size.

BRIEF DESCRIPTION OF THE DRAWINGS

FIG. 6 is a block diagram for showing the constitution of the microscopic system of the wide-field type.

DETAILED DESCRIPTION OF THE PREFERRED EMBODIMENTS

Preferred embodiments of the present invention will be described below with reference to the drawings.

Figure 1:
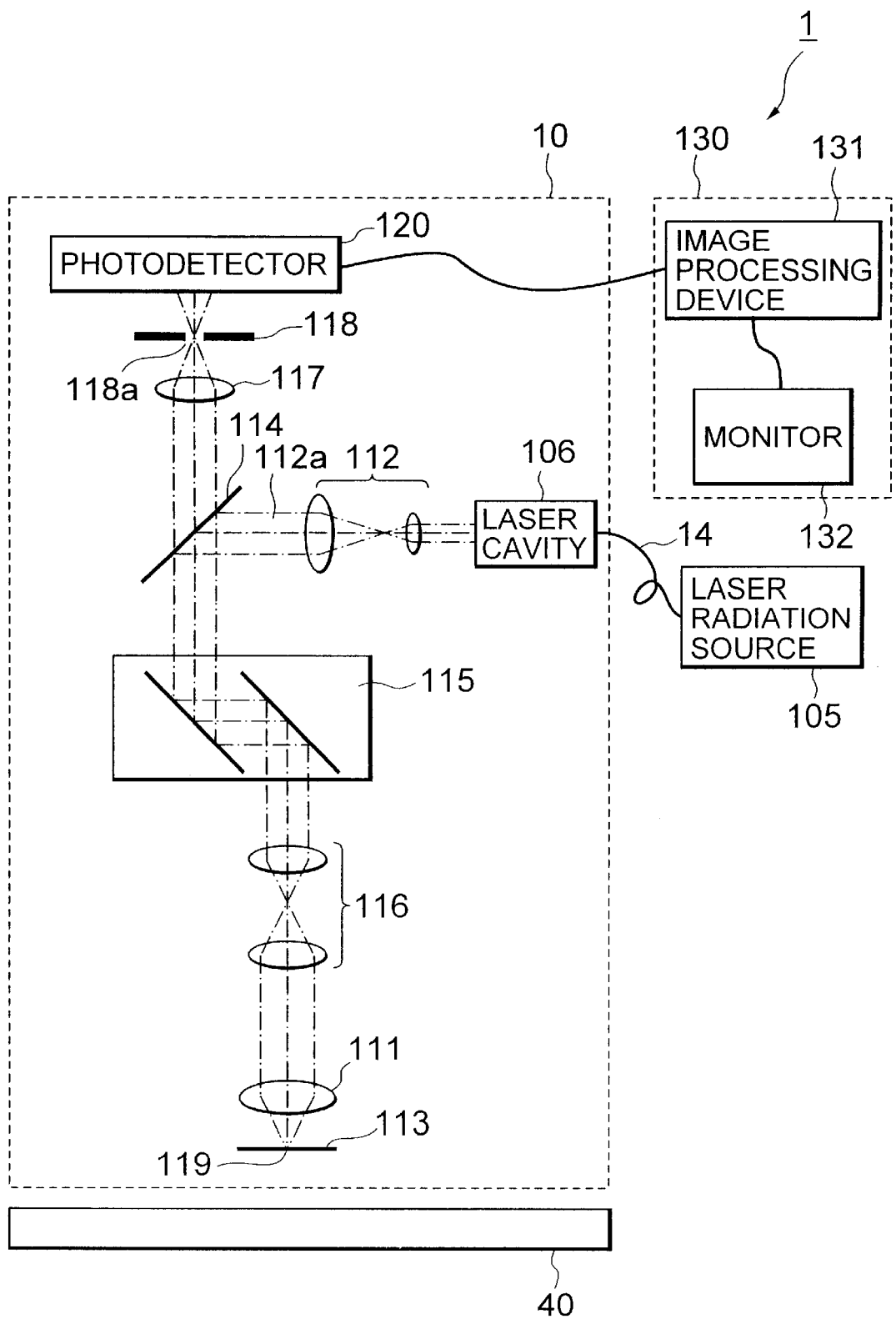
FIG. 1 is a block diagram for showing the constitution of a confocal laser scanning microscopic system according to a first embodiment of the present invention.
Figure 2:
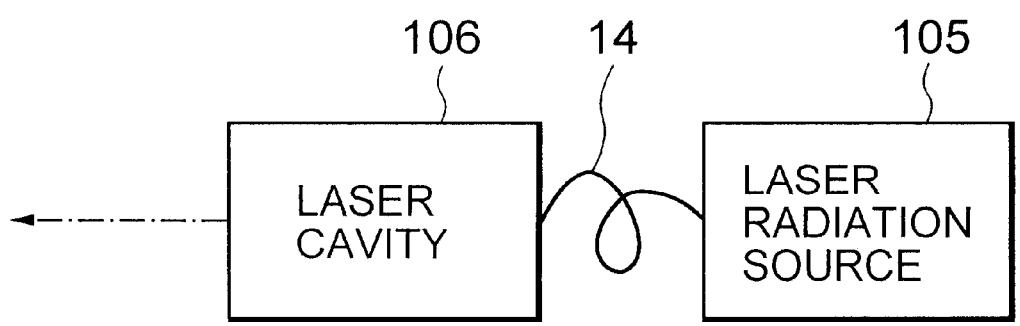
FIG. 2 is a schematic view of a deep ultraviolet laser light source.

FIG. 1 is a block diagram for showing the constitution of a confocal laser scanning microscopic system according to a first embodiment of the present invention, and FIG. 2 is a schematic view of a deep ultraviolet laser light source. In these drawings, identical portions to those of the confocal laser scanning microscopic system shown in FIG. 4 are given the same referential numerals and symbols.

Figure 4:
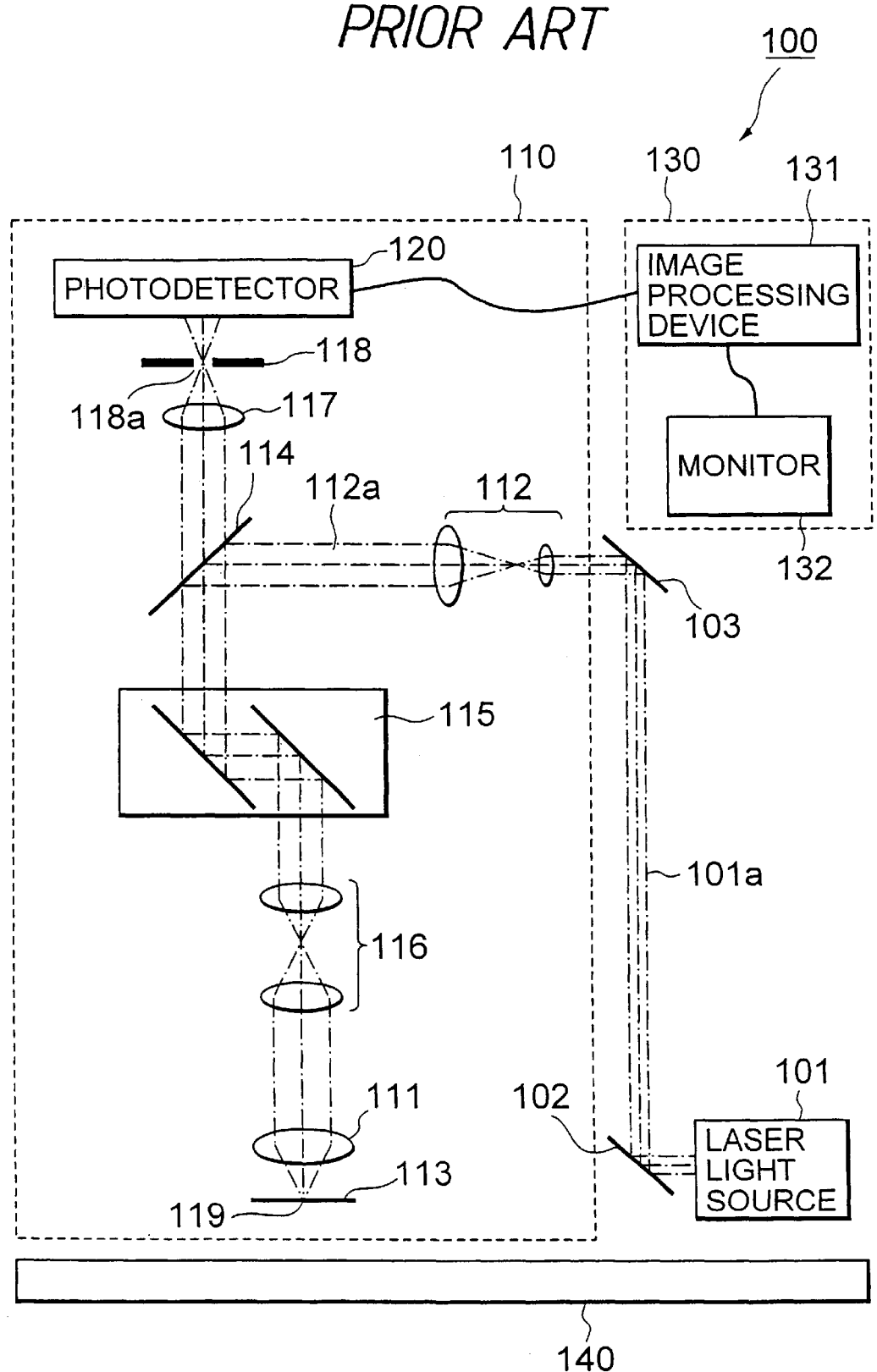
FIG. 4 is a block diagram for showing the constitution of the confocal laser scanning microscopic system.

A confocal laser scanning microscopic system (confocal laser scanning microscope) 1 is different from the conventional confocal laser scanning microscopic system 100 shown in FIG. 4 in that the laser radiation source (basic laser light generating means) 105 and the laser cavity (wavelength converting means) 106 are separated from each other, the laser radiation source 105 and the laser cavity 106 are connected to each other by an inexpensive optical fiber 14 for visible light, and the laser cavity 106 is incorporated in the microscope main body 10.

The microscope main body 10 comprises the laser cavity 106 which receives a laser light from the laser radiation source 105 through the optical fiber 104, a beam expander 112 for expanding the laser light from the cavity 106 to a light beam 112a which has a sufficient size to cover the pupil plane of the objective lens 111, a beam splitter 114 which does not transmit the laser light, but transmits therethrough a light reflected by a sample 113, a two-dimensional scanner unit 115 for two-dimensionally scanning the laser light, a relay lens 116, a collective lens 117, a pin hole plate 118 which is disposed at a position conjugate to the focal plane of the objective lens 111 and is formed with a pin hole 118a for transmitting only a light collected by the collective lens 117 therethrough, and a photo detector 120 for detecting the light transmitted through the pin hole 118a so as to convert such light into an electric signal.

The optical image system 130 comprises an image processing unit 131, a monitor 132, and the like, for forming an image of the sample 113 on the basis of the electric signal from the photo detector 120.

The microscope main body 10 is mounted on an anti-vibration table 40 for making up for a high image quality.

An operation of the confocal laser scanning microscopic system 1 having the aforementioned structure will be described below.

The laser light 101a having the wavelength of 532 nm radiated from the laser radiation source 105 is guided to the microscope main body 10 through the optical fiber 14, and is converted into a laser light having the wavelength of 266 nm by the laser cavity 106. This laser light becomes a light beam 112a in an expanded size to cover the pupil size of the objective lens 111 by the beam expander 112, is reflected by the beam splitter 114, is two-dimensionally scanned in directions perpendicular to each other by the two-dimensional scanner unit 115, and is irradiated as a spot 119 on the focal plane on the sample 113 by means of the relay lens 116 and the objective lens 111.

The reflected light of the spot 119 which is two-dimensionally scanned on the sample 113 goes back in the optical path from the objective lens 111 to the relay lens 116 and then to the two-dimensional scanner unit 115, so as to pass through the beam splitter 114.

The light transmitted through the beam splitter 114 is collected on the pin hole 118a by the collective lens 117, and only the light transmitted through the pin hole 118a is, after being converted into an electric signal by the photo detector 120, displayed on the optical image system 130 as an image.

According to this embodiment, the reflection mirrors 102 and 103 which are used to guide the laser light 101a into the optical path of the microscope main body 10 from the laser cavity 106 in the conventional microscope are no longer required, so that an operation for adjusting a deviation of the reflection mirror 102 or 103 due to a change with time, or the like, can be omitted.

Also, since the laser radiation source is not required to be mounted on the anti-vibration table 40, the anti-vibration table 40 can be formed to be smaller in size than the anti-vibration table 140 in the conventional microscope.

For this reason, the manufacturing cost can be reduced, compared with the conventional system.

Figure 3:
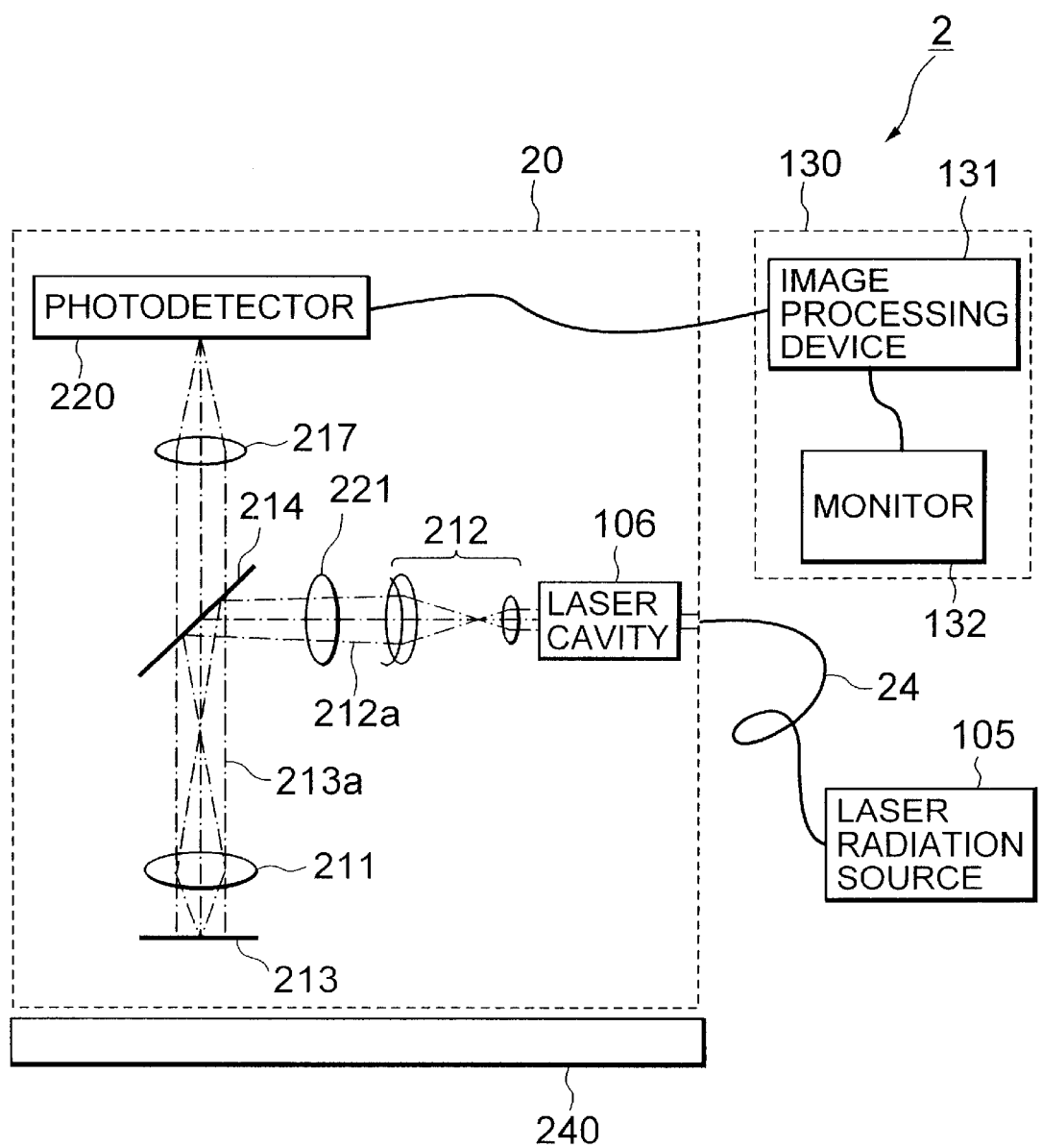
FIG. 3 is a block diagram for showing the constitution of a microscopic system of the wide-field type according to a second embodiment of the present invention.

FIG. 3 is a block diagram for showing the constitution of a microscopic system of the wide-field type according to a second embodiment of the present invention. In FIG. 3, identical portions to those of the wide-field microscope shown in FIG. 6 are given the same referential numerals and symbols.

Figure 5:
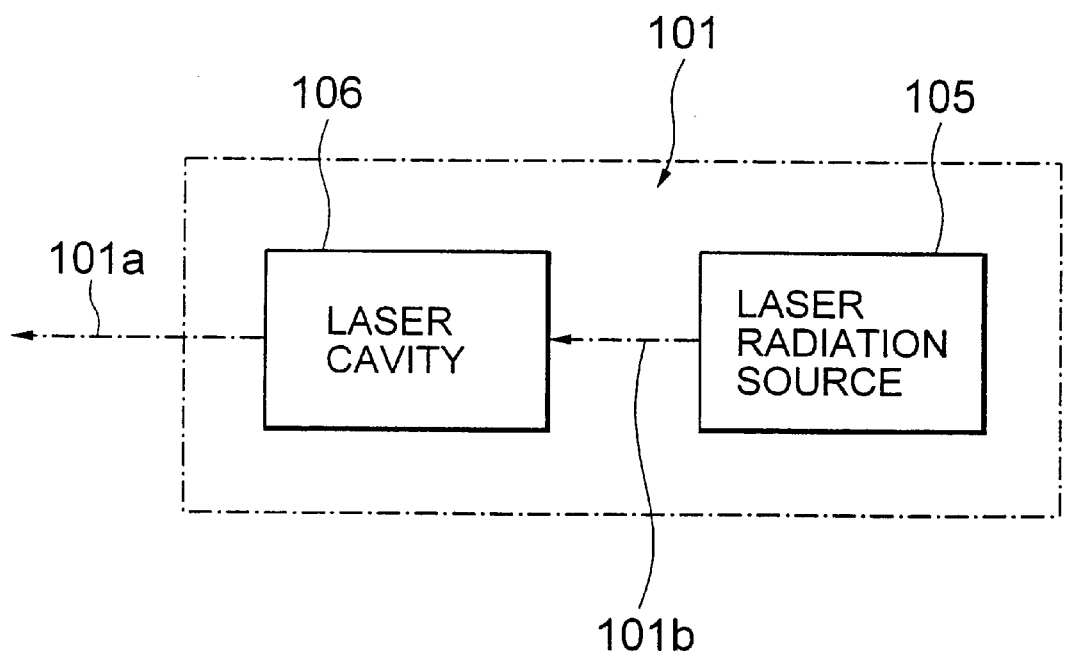
FIG. 5 is a schematic view of a deep ultraviolet laser light source according to the prior art.

The microscopic system (laser microscope) 2 of the Koehler illumination type of the present second embodiment is different from the conventional microscopic system of the Koehler illumination type shown in FIG. 5 in that the laser radiation source (basic laser light generating means) 105 and the laser cavity (wavelength converting means) 106 are separated from each other, the laser radiation source 105 and the laser cavity 106 are connected to each other by an inexpensive optical fiber 24 for visible light, and the laser cavity 106 is incorporated in the microscope main body 20.

The microscope main body 20 comprises the laser cavity 106 which receives laser light from the laser radiation source 105 through the optical fiber 24, a beam expander 212 for expanding the laser light from the laser cavity 106 to a light beam 212a having a sufficient size to cover the pupil plane of an objective lens 211, a condensing lens 221, a beam splitter 214 which does not transmit the laser light, but transmits therethrough a light 213a reflected by a sample 213, a second objective lens 217, and a photo detector 220 for detecting a light focused by the second objective lens 217 so as to convert such light into an electric signal.

An optical image system 130 comprises an image processing unit 131, a monitor 132, and the like, for forming an image of the sample 213 on the basis of the electric signal from the photo detector 220. The microscope main body 20 is mounted on an anti-vibration table 240.

An operation of the microscopic system of the Koehler illumination type having the aforementioned structure will be described below.

The laser light having the wavelength of 532 nm radiated from the laser radiation source 105 is guided to the microscope main body 20 through the optical fiber 24, and is converted into a laser light having the wavelength of 266 nm by means of the laser cavity 106. This laser light becomes a light beam 212*a* of an expanded size to cover the pupil size of the objective lens 211 by means of the beam expander 212, and is reflected by the beam splitter 214 to be uniformly irradiated on the spot 213 by the objective lens 211.

The reflected light 213*a* from the sample 213 goes back to the objective lens 211, the beam splitter 214, and then the second objective lens 217, so as to be condensed on the photo detector 220 by this second objective lens 217.

The reflected light 213*a* is, after being converted into an electric signal by the photo detector 220, displayed on the optical image system 130 as an image.

According to this embodiment, the optical fiber (optical fiber bundle) 104 made of expensive quartz, or the like, is no longer required for guiding the laser light from the laser cavity 106 into the optical path of the microscope main body 20, and the laser light can be guided from the laser radiation source to the laser cavity 106 by means of the inexpensive optical fiber 24 for visible light. Thus, the manufacturing cost can be reduced, compared with the conventional microscopic system.

Note that, in the aforementioned first embodiment, description was made on a case in which the present invention is applied to a microscopic system using a deep ultraviolet laser light with the wavelength of 266 nm. However, the present invention can be applied to any confocal laser scanning microscopic system which employs a laser light source utilizing high harmonic wavelength conversion.

As described above, according to the laser microscope of the present invention, an optical fiber made of expensive quartz, or the like, is not used for, for example, a wide-field microscope. In this case, an inexpensive optical fiber is enough, so that the manufacturing cost can be reduced.

In the confocal laser scanning microscope according to the preferred embodiment of the present invention, reflection mirrors requiring adjustment are not longer necessary and the anti-vibration table can be made small in size, so that the manufacturing cost can be reduced further.

What is claimed is:

1. A laser microscope provided with a microscope main body mounted on an anti-vibration table and a laser light source for supplying a laser light to this microscope main body, wherein said laser light source comprises a basic laser light generating means for radiating a laser light of a predetermined wavelength and a wavelength converting means for converting the wavelength of a laser light from said basic laser light generating means, characterized in that:

said basic laser light generating means and said wavelength converting means are separated from each other, said basic laser light generating means and said wavelength converting means are connected to each other by means of optical fiber, and said wavelength converting means is incorporated into said microscope main body.

2. A confocal laser scanning microscope provided with a microscope main body mounted on an anti-vibration table and a laser light source for supplying a laser light to this microscope main body, wherein said laser light source comprises a basic laser light generating means for radiating a laser light of a predetermined wavelength and a wavelength converting means for converting the wavelength of a laser light from said basic laser light generating means, characterized in that:

said basic laser light generating means and said wavelength converting means are separated from each other, said basic laser light generating means and said wavelength converting means are connected to each other by means of optical fiber, and said wavelength converting means is incorporated into said microscope main body.

* * * * *